Figure 1:
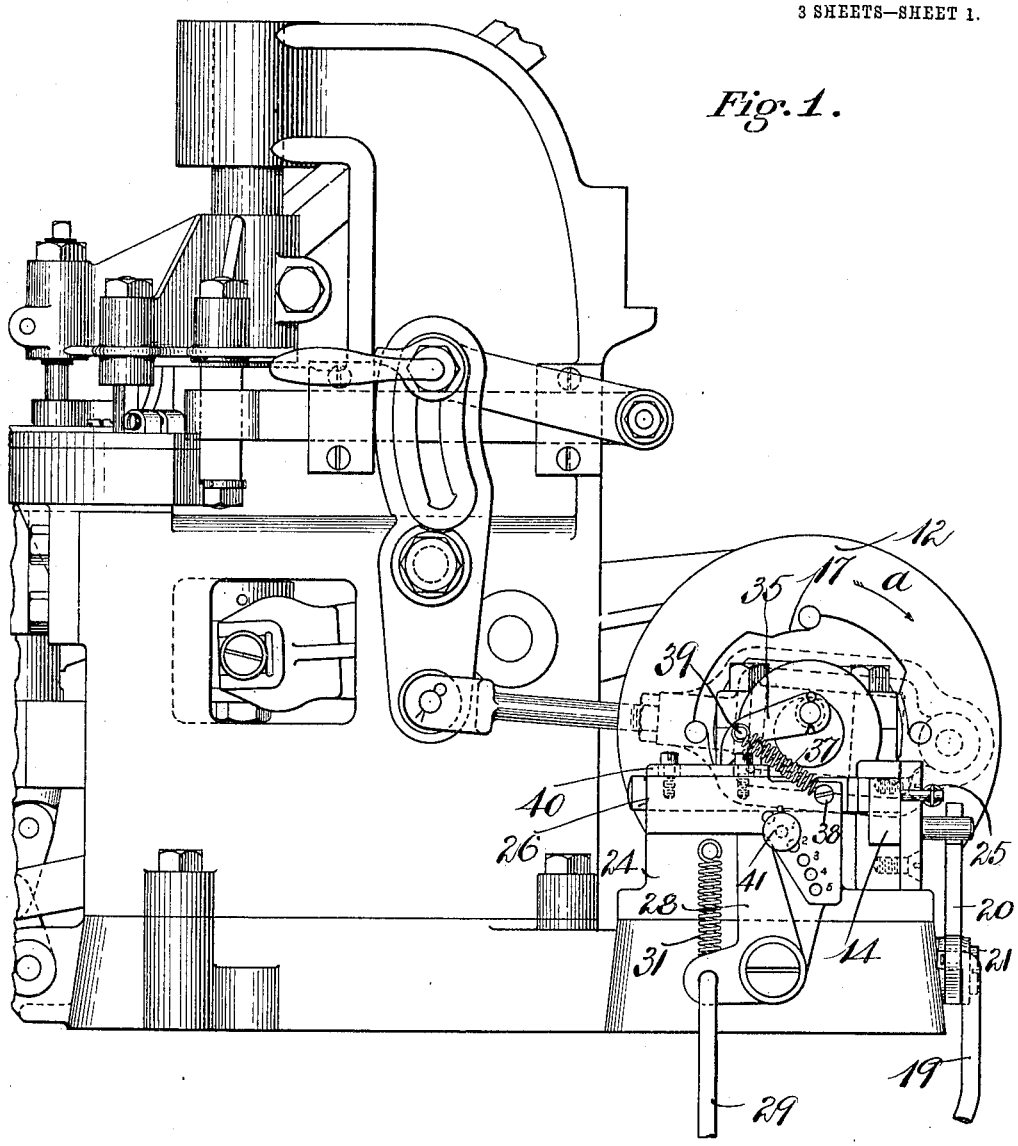
Figure 1:
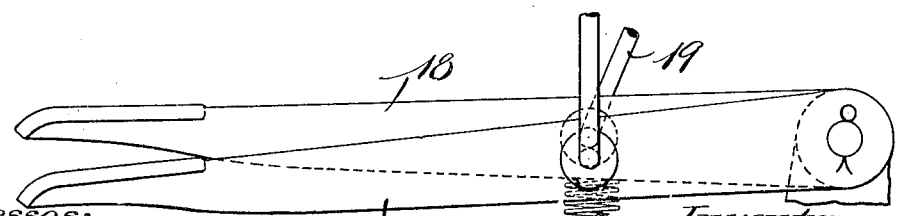

No. 887,544. PATENTED MAY 12, 1908.
S. E. TAFT.
CLUTCH MECHANISM FOR LACING HOOK SETTING MACHINES.
APPLICATION FILED JAN. 8, 1908.

3 SHEETS—SHEET 1.

No. 887,544. PATENTED MAY 12, 1908.
S. E. TAFT.
CLUTCH MECHANISM FOR LACING HOOK SETTING MACHINES.
APPLICATION FILED JAN. 8, 1908.

3 SHEETS—SHEET 2.

Witnesses: Inventor:
Sydney E. Taft

No. 887,544. PATENTED MAY 12, 1908.
S. E. TAFT.
CLUTCH MECHANISM FOR LACING HOOK SETTING MACHINES.
APPLICATION FILED JAN. 8, 1908.
3 SHEETS—SHEET 3.
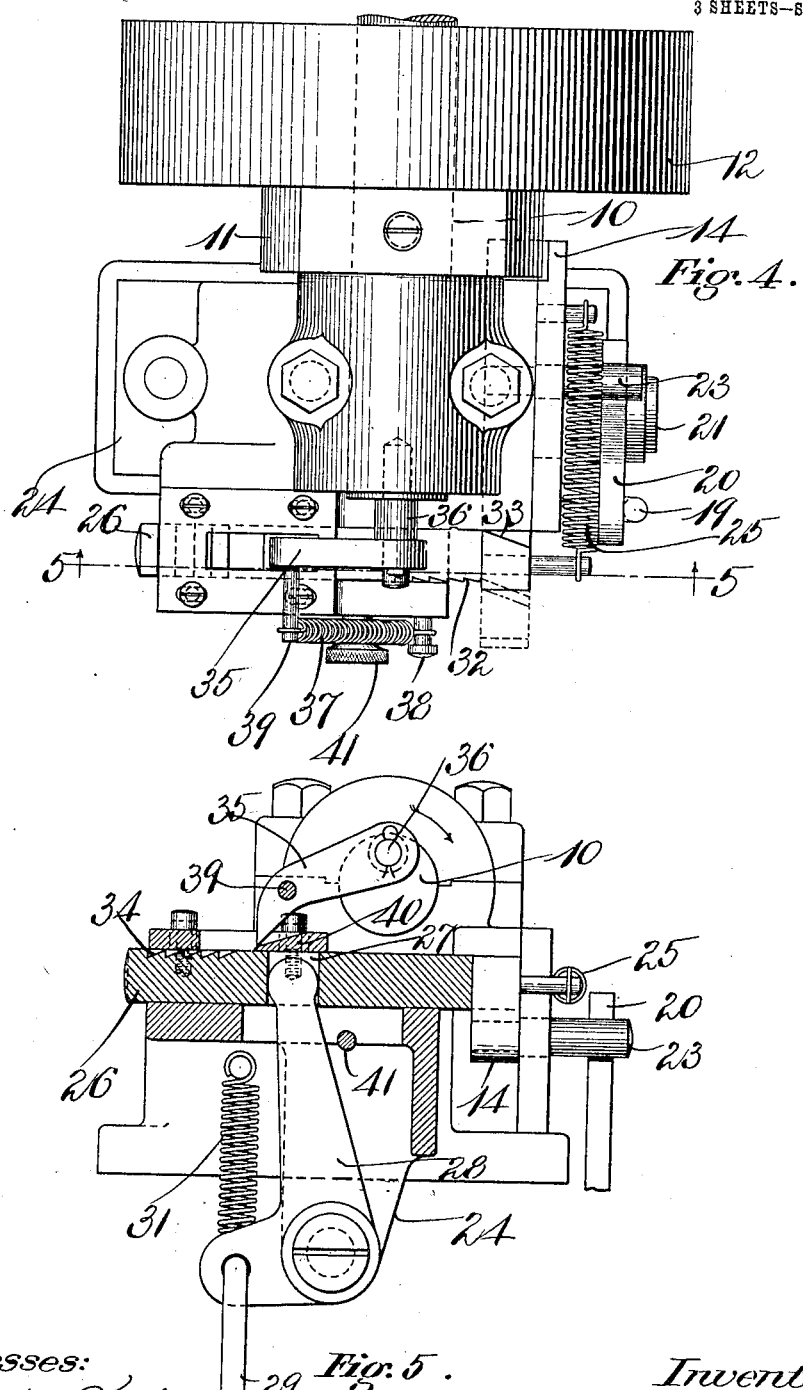
Witnesses: Inventor:

UNITED STATES PATENT OFFICE.

SYDNEY E. TAFT, OF SOUTH FRAMINGHAM, MASSACHUSETTS, ASSIGNOR TO AMERICAN LACING HOOK CO., A CORPORATION OF NEW JERSEY.

CLUTCH MECHANISM FOR LACING-HOOK-SETTING MACHINES.

No. 887,544.

Specification of Letters Patent.

Patented May 12, 1908.

Application filed January 8, 1908. Serial No. 409,759.

*To all whom it may concern:*

Be it known that I, SYDNEY E. TAFT, a citizen of the United States, residing at South Framingham, in the county of Middlesex and State of Massachusetts, have invented new and useful Improvements in Clutch Mechanism for Lacing-Hook-Setting Machines, (Case A,) of which the following is a specification.
This invention relates to a clutch mechanism which is particularly adapted to be used in connection with machines for setting lacing hooks in the uppers of boots and shoes, the object of the invention being to provide a clutch mechanism which can be set so as to drive one, two, three, four, five or more hooks in the upper of a boot or shoe and which is also capable of being operated by the operator at any desired time so that in case a lacing hook becomes jammed or improperly driven the operator can instantly stop the machine, remove the hook from the upper of the boot or shoe and set a new hook in the place of the hook which has been removed and continue the operation to insert the desired number of hooks, say five in number, and then begin a new cycle of operations in which the mechanism will automatically disconnect the clutch from the shaft at the end of any predetermined number of hooks which may be driven in the upper. The device is also adapted to be set so that the automatic throw-out of the clutch is eliminated and the clutch may be used in the usual manner by the operator setting as many hooks as desired and operating the same by releasing the treadle when the number of hooks desired have been set in the upper.

While I have illustrated and described my improved clutch mechanism as adapted to be particularly used in connection with a lacing hook setting machine, it is evident that the same may be used in connection with other mechanisms in which it is desired to have the main driving shaft make a certain number of rotations and then be automatically disconnected from the driving pulley and also in which said driving shaft is under the control of the operator independent of the automatic clutch operating devices.

In another application filed of even date herewith I have set forth another embodiment of my invention for performing the same functions as the present invention.

The invention consists in the combination and arrangement of parts set forth in the following specification and particularly pointed out in the claims thereof.

Figure 2:
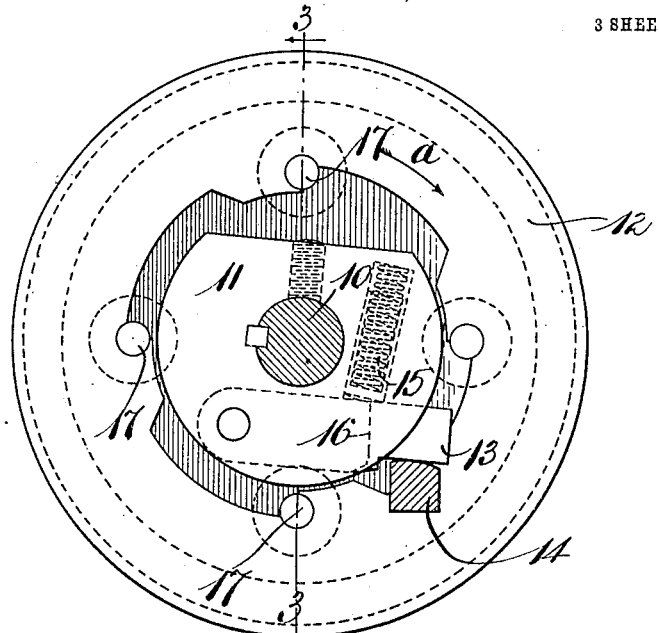
Figure 3:
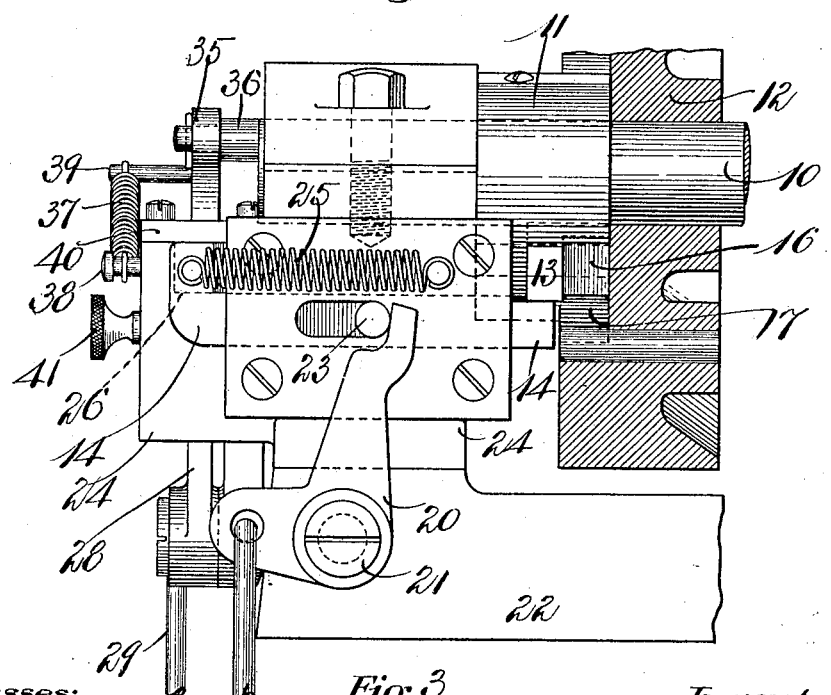

Referring to the drawings: Figure 1 is a side elevation of a portion of a lacing hook setting machine similar in construction to that for which Letters Patent were issued to William P. Bartel and myself June 4, 1907, No. 855,497. The details of construction and the operation of this lacing hook setting machine it is not necessary to particularly describe in this application and the same is illustrated in connection with my improved clutch in order to illustrate one embodiment of the use of the device. Fig. 2 is a front elevation of the clutch *per se*, the shaft and tripper slide being shown in section. Fig. 3 is a sectional elevation taken on line 3—3 of Fig. 2 as viewed in the direction of the arrows on said line. Fig. 4 is a plan view of the clutch and clutch mechanism. Fig. 5 is a sectional elevation taken on line 5—5 of Fig. 4 as viewed in the direction of the arrows thereon.

Like numerals refer to like parts throughout the several views of the drawings.

In the drawings, 10 is the main driving shaft; 11 is one clutch member keyed to said shaft. 12 is another member of the clutch consisting of a pulley which is free to rotate upon the shaft. A locking dog or arm 13 is pivoted to the member 11 and when in the position illustrated in Fig. 2—that is, with the tripper slide 14 in engagement therewith, said locking dog allows the clutch pulley 12 to rotate freely without rotating the shaft. When, however, the tripper slide 14 is withdrawn from engagement with the locking dog 13, said locking dog is immediately thrown outwardly at its free end by the spring 15 and is then engaged at the shoulder 16 thereon by one of the clutch teeth 17, 17. The two members of the clutch 11 and 12 are then locked together and the rotation of the pulley in the direction of the arrow *a* thereon (Fig. 2) causes the member 11 to be rotated, together with the shaft 10 to which it is fastened, in the direction of said arrow.

When the machine is at rest and the operator is placing an upper in position in readiness to have a lacing hook set therein, the pulley 12 is free to rotate and the tripper slide 14 is in engagement with the locking dog 13, as illustrated in the different figures of the drawings.

When the operator desires to start the machine, she presses upon the treadle 18 (Fig. 1), thus, through the treadle rod 19, rocking a lever 20 which is pivoted at 21 to the base 22 of the machine. The upper end of the lever 20 bears against a pin 23 which is fast to the tripper slide 14. The tripper slide 14 is arranged to slide in a bracket 24 and has a spring 25 attached thereto and to said bracket, the action of said spring tending to hold said tripper slide toward the right (Fig. 3) and in engagement with the locking dog 13. The tripper slide is held out of engagement with the locking dog 13 or with the clutch by a holder slide 26, which is particularly illustrated in Figs. 4 and 5. This holder slide has a slot 27 therein into which projects the rounded upper end of a lever 28 which is connected by a treadle rod 29 to a treadle 30.

A spring 31, fast at one end to the lever 28 and at the other end to the bracket 24 acts to move the holder slide 26 toward the right (Fig. 5) and into engagement with the side of the tripper slide, when said tripper slide is forward or in engagement with the clutch.

Teeth 32 are formed upon the side of the holder slide 26 which are adapted, under certain conditions, to be engaged by the beveled end 33 of the tripper slide, as hereinafter described. Teeth 34 are formed upon the upper face of the holder slide which are adapted to be engaged by a pawl 35 pivotally connected to a crank-pin 36 on one end of the main driving shaft 10. A spring 37 is fastened at one end to a screw 38 on the bracket 24 and at the other end to a pin 39 on said pawl. The action of this spring tends to hold the pawl in engagement with the teeth 34 or with the plate 40 fast to the bracket 24, as the case may be and depending upon the position of the pawl and of the crank-pin 36 to which it is pivoted. A stop-pin 41 is provided which is adapted to be inserted in any one of the holes 0, 1, 2, 3, 4 or 5 provided in the bracket 24, as may be desired, for the purpose hereinafter specified, see Fig. 1.

The general operation of the mechanism hereinbefore specifically described is as follows: Assuming the parts to be in the relative positions illustrated in the different figures of the drawings, the operator depresses the treadle 18, thus pulling downwardly upon the treadle rod 19 and rocking the lever 20 toward the left (Fig. 3). This moves the pin 23 and the tripper slide to which said pin is connected toward the left in said figure and removes the tripper slide from beneath the free end of the locking dog 13 of the clutch. Said locking dog is then immediately thrown outwardly from the center by the spiral spring 15 and is engaged by one of the teeth 17 upon the clutch pulley 12. The parts of the clutch thus being locked together the shaft 10 is rotated in the direction of the arrow $a$ (Figs. 1 and 2) and the lacing hook machine then begins its operation of feeding and driving the lacing hooks in the upper of the shoe which has previously been placed therein by the operator.

When the tripper slide 14 has been moved, as hereinbefore described, to disengage the same from the locking dog 13, it is held back out of engagement with the clutch by the holder slide 26 which is moved across the tripper slide or toward the right (Figs. 4 and 5) until the lever 28 abuts against the stop pin 41. If this stop pin is in the hole marked "1" then the machine will make one rotation and the clutch will be disengaged and the machine will stop, thus driving one lacing hook. If, in the hole 2, two rotations of the shaft will be made and two lacing hooks driven; if in the hole 3, three rotations of the shaft; if in the hole 4, four rotations of the shaft and if in the hole 5, five rotations. Assuming, then, that the pin 41 is in the hole 1, the lever 28 will be rocked by its spring 31 toward the right until it engages the pin 41 and will thus move the holder slide 26 partly across the tripper slide 14 and thus will prevent the tripper slide from returning into engagement with the clutch, until, as the shaft 10 is rotated, the pawl 35 engages one of the teeth 34 and moves the slide 26 to the left (Fig. 5) a sufficient distance for the same to disengage the tripper slide and allow the spring 25 to move the tripper slide forward into the position shown in Fig. 3, when the same will be engaged by the locking dog as the clutch rotates and the clutch pulley disengaged from the driving shaft, the machine thus coming to a stop.

If the stop pin 41 is placed in the hole 2, then upon a repetition of the proceedings hereinbefore described, the holder 26 will move across in front of the tripper slide and will not be disengaged therefrom until two teeth have been engaged by the pawl 35, one at each rotation of the main shaft. The beveled front end 33 of the tripper slide engages the different teeth 32 upon the holder slide when said tripper slide is drawn backwardly, as illustrated in dotted lines (Fig. 4), it being understood that in the first movement of said tripper slide backwardly the same is moved to the position shown in broken and dotted lines (Fig. 4), thus allowing the holder slide 26 to move toward the right in said figure without engaging the beveled end 33 of the tripper slide. When the pawl 35 is in the position illustrated in Fig. 5, it will be seen that it is drawn out of engagement with the teeth 34 and upwardly onto the inclined upper face of the plate 40 and remains upon said plate until the rotation of the shaft hereinbefore described moves the outer end of the pawl forwardly to a sufficient distance for the same to drop off of said plate and into engagement with the teeth 34 upon the slide 26.

When the operator desires to stop the machine, because of a lacing hook having become jammed or badly driven in the upper, or for any other reason, she lowers the treadle 30, thus rocking the lever 28 and moving the holder slide 26 toward the left (Figs. 4 and 5), releasing the tripper slide 14, which is then moved forward by its spring 25 and engages the locking dog 13 to disconnect the clutch pulley from the shaft. After having taken a lacing hook out of the upper, a new lacing hook can then be driven to take the place of the imperfect lacing hook which has been removed and the remainder of the lacing hooks driven while the operator keeps both treadles depressed, the treadle 30 being released as soon as the requisite number of lacing hooks have been set. If it is desired to run the machine without the automatic stopping device, the stop pin 41 is placed in the hole "0" and thus the lever 28 will be held in the position shown in Fig. 5 and the holder slide 26 will be prevented from moving across in front of the tripper slide when said tripper slide is thrown out of engagement with the locking dog, as hereinbefore described.

While I have illustrated and described my invention as operating a certain type of clutch, it is evident that different forms of clutches may be operated without departing from the spirit of my invention, so long as a tripper slide is employed to operate the clutch to disconnect the same from operative engagement with the shaft at the end of a predetermined plurality of rotations of said shaft.

Having thus described my invention, what I claim and desire by Letters Patent to secure is:

1. In a clutch mechanism, a driving shaft, a member fast to said driving shaft, a member rotatable on said driving shaft, and means to lock said members together; in combination with a tripper slide adapted to engage said locking means and disconnect said clutch members from each other, means to move said tripper slide out of engagement with said locking means, a holding slide movable transversely of said tripper slide adapted to hold said tripper slide out of engagement with said locking means, instrumentalities adapted to operate said holding slide to release said tripper slide to engage said locking means and disconnect said clutch members at the end of a predetermined number of rotations of said shaft, and an adjustable stop to regulate the extent of movement of said holding slide relatively to said tripper slide, whereby said predetermined number of rotations may be varied.

2. In a clutch mechanism, a shaft, a clutch thereon, a tripper slide adapted to engage said clutch and unlock the same from said shaft, means to move said tripper slide out of engagement with said clutch, a holding slide movable at an angle to said tripper slide adapted to hold said tripper slide out of engagement with said clutch, instrumentalities adapted to operate said holding slide to release said tripper slide, whereby said tripper slide may engage said clutch and unlock the same from said shaft at the end of a predetermined number of rotations of said shaft, and an adjustable stop to regulate the movement of said holding slide relatively to said tripper slide, whereby said predetermined number of rotations may be varied.

3. In a clutch mechanism, a driving shaft, a member fast to said driving shaft, a member rotatable on said driving shaft, and means to lock said members together; in combination with a tripper slide adapted to engage said locking means and disconnect said clutch members from each other, means to move said tripper slide out of engagement with said locking means, a holding slide movable across the path of said tripper slide in one direction, adapted to hold said tripper slide out of engagement with said locking means, an adjustable stop to regulate the extent of movement of said holding slide relatively to said tripper slide, and mechanism to impart an intermittent movement to said holding slide in the opposite direction to release said tripper slide for the purpose specified.

4. In a clutch mechanism, a driving shaft, a member fast to said driving shaft, a member rotatable on said driving shaft, and means to lock said members together; in combination with a tripper slide adapted to engage said locking means and disconnect said clutch members from each other, means to move said tripper slide out of engagement with said locking means, a holding slide movable transversely of said tripper slide adapted to hold said tripper slide out of engagement with said locking means, teeth on said holding slide, and a pawl connected to said shaft adapted to engage said teeth and impart an intermittent movement to said holding slide to release said tripper slide for the purpose specified.

5. In a clutch mechanism, a driving shaft, a member fast to said driving shaft, a member rotatable on said driving shaft, and means to lock said members together; in combination with a tripper slide adapted to engage said locking means and disconnect said clutch members from each other, means to move said tripper slide out of engagement with said locking means, a holding slide movable transversely of said tripper slide adapted to hold said tripper slide out of engagement with said locking means, teeth on said holding slide, a pawl connected to said shaft adapted to engage said teeth and impart an intermittent movement to said holding slide to release said tripper slide for the purpose specified, teeth on said holding slide adapted to be engaged by said tripper slide, and a spring acting to hold said tripper slide in engagement with said last named teeth.

6. In a clutch mechanism, a driving shaft, a member fast to said driving shaft, a member rotatable on said shaft, and means to lock said members together; in combination with a tripper slide adpated to engage said locking means and disconnect said clutch members from each other, means to move said tripper slide out of engagement with said locking means, a holding slide movable across the path of said tripper slide adapted to hold said tripper slide out of engagement with said locking means, and mechanism adapted to impart an intermittent movement to said holding slide to release said tripper slide for the purpose specified, and other mechanism adapted to move said holding slide to release said tripper slide.

7. In a clutch mechanism, a driving shaft, a member fast to said driving shaft, a member rotatable on said driving shaft, and means to lock said members together; in combination with a tripper slide adapted to engage said locking means and disconnect said clutch members from each other, means to move said tripper slide out of engagement with said locking means, a holding slide movable transversely of said tripper slide adapted to hold said tripper slide out of engagement with said locking means, teeth on said holding slide, a pawl connected to said shaft adapted to engage said teeth and impart an intermittent movement to said holding slide to release said tripper slide for the purpose specified, and a plate adapted to lift said pawl out of engagement with said teeth.

8. In a clutch mechanism, a shaft, a clutch, a tripper slide, means adapted to move said slide to operate said clutch and disconnect the same from operative engagement with said shaft at the end of a predetermined plurality of rotations of said shaft, a holding slide movable across the path of said tripper slide in one direction adapted to hold said tripper slide stationary, an adjustable stop to regulate the extent of movement of said holding slide relatively to said tripper slide, and mechanism to impart an intermittent movement to said holding slide in the opposite direction to release said tripper slide for the purpose specified.

9. In a clutch mechanism, a shaft, a clutch, a tripper slide, means adapted to move said slide to operate said clutch and disconnect the same from operative engagement with said shaft at the end of a predetermined plurality of rotations of said shaft, a holding slide movable transversely of said tripper slide adapted to hold said tripper slide stationary, teeth on said holding slide, and a pawl connected to said shaft adapted to engage said teeth and impart an intermittent movement to said holding slide to release said tripper slide for the purpose specified.

10. In a clutch mechanism, a shaft, a clutch, a tripper slide, a spring adapted to move said slide to operate said clutch and disconnect the same from operative engagement with said shaft at the end of a predetermined plurality of rotations of said shaft, a holding slide movable transversely of said tripper slide adapted to hold said tripper slide against the action of said spring, teeth on said holding slide, a pawl connected to said shaft adapted to engage said teeth and impart an intermittent movement to said holding slide to release said tripper slide for the purpose specified, and teeth on said holding slide adapted to be engaged by said tripper slide, said spring acting to hold said tripper slide in engagement with said last named teeth.

In testimony whereof I have hereunto set my hand in presence of two subscribing witnesses.

SYDNEY E. TAFT.

Witnesses:
  Louis A. Jones,
  Charles S. Gooding.